US006428875B1

(12) United States Patent
Takahashi et al.

(10) Patent No.: US 6,428,875 B1
(45) Date of Patent: Aug. 6, 2002

(54) DECORATIVE MATERIAL

(75) Inventors: Kazuhiro Takahashi; Masataka Takemoto, both of Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/570,536

(22) Filed: May 12, 2000

(30) Foreign Application Priority Data

May 12, 1999 (JP) .......................................... 11-130728

(51) Int. Cl.[7] ............................ B32B 3/00; A47G 35/00

(52) U.S. Cl. ....................... 428/172; 428/141; 428/204; 428/206; 428/542.2

(58) Field of Search ................................ 428/172, 204, 428/206, 542.2, 67, 141, 212

(56) References Cited

U.S. PATENT DOCUMENTS

| | | | | |
|---|---|---|---|---|
| 4,217,385 A | * 8/1980 | Shorfuay et al. | ........... | 428/159 |
| 4,310,370 A | 1/1982 | Arai et al. | | |
| 4,464,423 A | 8/1984 | Labianca et al. | | |
| 5,256,465 A | * 10/1993 | Marfin et al. | ............... | 428/158 |
| 5,804,285 A | * 9/1998 | Kobayashi et al. | ......... | 428/172 |

FOREIGN PATENT DOCUMENTS

| | | |
|---|---|---|
| JP | 51-41364 | 4/1976 |

* cited by examiner

*Primary Examiner*—Donald J. Loney
(74) *Attorney, Agent, or Firm*—Parkhurst & Wendel, L.L.P

(57) ABSTRACT

There is provided a decorative material that gives the impression of unevenness due to the differences in gloss of a film formed on the surface of the decorative material. This decorative material is excellent in solvent resistance; a pattern formed on it is not easily erased even when the decorative material is wiped with cloth or the like impregnated with a solvent. Such a decorative material can be produced in the following manner: a coloring layer 3 and a pattern layer 4 are formed on the surface of a substrate 2 in the order mentioned; and, before forming a surface-protective layer 7 by the use of an ionizing radiation hardening resin composition, a coating layer 5 capable of preventing the penetration of the ionizing radiation hardening resin composition into the underlying layers is formed on the pattern layer 4 by using a hardening resin, and a highly permeable pattern layer 6 having permeability for the ionizing radiation hardening resin composition higher than that of the underlying coating layer 5 is provided on top of the coating layer 5 by the use of a hardening resin.

6 Claims, 1 Drawing Sheet

DECORATIVE MATERIAL

BACKGROUND OF THE INVENTION

1. Field of the Invention

The present invention relates to a decorative material having a pattern formed on its surface, and, more particularly, to a patterned decorative material having uneven surface gloss that makes the pattern impressive, the surface of the decorative material including the pattern being excellent in durability.

2. Related Art

A decorative material is produced, for example, by printing a pattern on a substrate, or by coating a substrate with a proper material, or by imparting unevenness to a substrate, and used for the interior or exterior finishing of buildings, for the manufacturing of furniture, or the like. For the substrate, a proper material is selected from board-type materials such as wooden boards, metallic plates and slate boards, and sheet-type materials such as paper and plastic films, depending on the intended use of the resulting decorative material.

In the case where a pattern is formed on a substrate by means of printing, greater effects of printing are obtained when a sheet-type substrate is used. Moreover, even if a large number of sheet-type substrates are handled at one time, they do not become bulky unlike board-type substrates. Sheet-type substrates are therefore often used for producing decorative materials. The term "decorative materials" herein used include both decorative laminates produced by the use of board-type substrates, and decorative sheets produced by the use of sheet-type substrates.

In the production of decorative materials, it is also important to impart texture to them. For this purpose, there have been proposed various methods for delustering or roughening the surface of a decorative material, in which delustering or roughening is conducted so that the delustered or recessed parts of the surface will coincide with specific parts of a pattern present on the decorative material. By the use of these methods, it is possible to obtain decorative materials having patterns that appear to be more realistic to the surface of natural wood board.

Japanese Patent Publication No. 41364/1976 discloses a process for producing a veined decorative material whose surface has uneven gloss or roughness. This process comprises the steps of preparing three or more ink compositions by gradually increasing granular solid content; successively forming, on a base sheet, patterns of the winter grain of annual ring, the summer grain of annual ring and vessels in wood by the use of the ink compositions in the order of increasing granular solid content, thereby forming a pattern of the grain of wood; and applying a coating material to the entire surface of this pattern to form thereon a coating film that can serve as a surface-protective layer. According to this process, a larger part of the coating material applied penetrates into a pattern that has been formed by using an ink composition having a higher granular solid content, so that uneven gloss or roughness is imparted to the surface of the decorative material.

The production process disclosed in the above-described patent publication has the following drawback. As shown in FIG. 2, a coloring layer 3 and a pattern layer 4 that are usually formed on a substrate 2 are covered partially with a highly permeable pattern layer 6 containing granular solid components. Moreover, the coloring layer 3 and the pattern layer 4 contain granular solid pigments, and a pattern included in this pattern layer is formed discontinuously. Therefore, in the case where an absorptive/permeable material such as paper or non-woven cloth is used as the substrate 2, even those parts of a surface-protective layer 7 that are not right above the pattern layer 6 are recessed below the surface and become more or less mat because of the undesirable absorption of the surface-protective layer 7 by the substrate 2, although these parts should be glossy or form non-recessed parts 8'. For this reason, the differences in surface gloss or in level of the surface between those parts of the surface-protective layer that are right above the pattern layer 6 and the other area become small and obscure.

Further, in the production process disclosed in the above patent publication, a hardening polyurethane resin is used for forming the surface-protective layer, while ink compositions containing as their binder a mixture of nitrocellulose and alkyd, or polyamide resins are used for forming the patterns. The adhesion between the surface-protective layer and the pattern layer is therefore insufficient. Moreover, special regards are not paid to the solvent resistance of the surface of the decorative material, including the pattern. If no efforts are made to increase the adhesion between the two layers, when an adhesive cellophane tape is adhered to the surface of the decorative material and then peeled off, the surface-protective layer tends to be separated from the decorative material along with the adhesive cellophane tape. Further, if no efforts are made to improve the solvent resistance of the decorative material, there is such a possibility that, when the decorative material is wiped with a cloth or the like impregnated with a solvent, the layers constituting the decorative material is successively removed, and the pattern is exposed and finally erased.

Although there are a variety of physical or chemical requirements in the field of decorative materials, it is essential that patterns formed on decorative materials remain under any condition. If the patterns disappear, the decorative materials cannot fulfill anymore their original function of decorating objects to which they are adhered, even if the base sheets remain.

SUMMARY OF THE INVENTION

An object of the present invention is to provide a patterned decorative material whose surface has deep and sharp recesses or distinguishable delusterings corresponding to specific parts of the pattern. Another object of the present invention is to provide a patterned decorative material having, in addition to the above feature, excellent solvent resistance so that the pattern is not easily erased even when the surface of the decorative material is wiped with a cloth or the like impregnated with a solvent.

In the present invention, the surface of the decorative material produced is covered with a surface-protective layer of an ionizing radiation hardening resin composition excellent in both physical and chemical properties. The aforementioned problems can be solved by forming a coating film capable of preventing the ionizing radiation hardening resin composition from penetrating into the underlying layers, and by providing, on top of this coating film, a pattern layer having permeability for the ionizing radiation hardening resin composition higher than that of the coating film.

The present invention relates to a decorative material comprising an absorptive/permeable substrate, and a surface-protective layer made of a film of an ionizing radiation hardening resin composition that has been hardened by crosslinking. An even and uniform penetration-preventing coating layer, which has a low permeability for the ionizing radiation hardening resin composition, is provided between the substrate and the surface-protective layer, covering the entire surface of the substrate. A highly permeable pattern layer made from a resin including a filler, which has a permeability for the ionizing radiation hardening resin composition higher than that of the penetration-preventing coating layer, is provided on the penetration-preventing coating layer. The surface-protective layer has recesses and/or delusterings at right above the highly permeable pattern layer.

In the present invention, it is preferable that both the penetration-preventing coating layer and the highly permeable pattern layer be made of films of hardening resins, hardened by crosslinking.

Further, it is also preferable that the penetration-preventing coating layer be made from a polyurethane resin obtained by crosslinking an unsaturated polyester urethane polyol with an isocyanate for hardening and that the surface-protective layer be made of a film of prepolymers, oligomers and/or monomers of (meth)acrylate that has been hardened by crosslinking.

Further, in the present invention, it is preferable that the penetration-preventing coating layer be mat. Furthermore, it is preferable that another pattern layer be laminated to the surface of the substrate or that an even and uniform coloring layer and another pattern layer be laminated to the surface of the substrate in the order mentioned.

In the present invention, a surface-protective layer made of a film of an ionizing radiation hardening resin composition that has been hardened by crosslinking is provided so as to cover an absorptive/permeable substrate; and, under this layer, a highly permeable pattern layer having high permeability for the ionizing radiation resin composition that is used for forming the surface-protective layer is formed, and, under this pattern layer, a penetration-preventing coating layer is provided. Therefore, those parts of the surface-protective layer that are right above the highly permeable pattern layer are recessed below the surface and/or delustered, and, at the same time, have decreased gloss because the ionizing radiation hardening resin composition penetrates into the highly permeable pattern layer, while the other area does not undergo recession or decrease in gloss because the penetration-preventing coating layer prevents the ionizing radiation hardening resin composition from penetrating into the underlying layers. For this reason, even when an absorptive/permeable material such as paper is used as the substrate, it is possible to produce deep and sharp recesses on the surface of the decorative material, corresponding to specific parts of the pattern formed on the substrate.

In the present invention, since both the penetration-preventing coating layer and the highly permeable pattern layer are made of resin films hardened by crosslinking, the decorative material shows high solvent resistance; these layers are not easily removed even when the surface of the decorative material is wiped with a cloth or the like impregnated with a solvent. In addition, since the entire surface of the absorptive/permeable substrate is coated with the penetration-preventing coating layer, unfavorable absorption/permeation of the surface-protective layer by the substrate does not occur at an area where the highly permeable pattern layer is not formed. Therefore, the differences in level of the surface and in surface gloss between the parts right above the highly permeable pattern layer and the other area are more emphasized and become clear.

Further, in the present invention, since the surface-protective layer is formed by the use of a coating composition including a material having (meth)acryloyl group such as a prepolymer of (meth)acrylate, and the penetration-preventing coating layer is formed by the use of an unsaturated polyester urethane polyol and an isocyanate, the (meth)acryloyl group contained in the surface-protective layer chemically combines with the unsaturated polyester moiety in the penetration-preventing coating layer to increase the adhesion between the two layers, and to impart, to the resulting decorative material, improved resistance to abrasion with steel wool and also to solvents.

Furthermore, according to the present invention, it is possible to provide a mat decorative material excellent in durability by making its penetration-preventing coating layer mat. Furthermore, according to the present invention, it is possible to provide a more decorative decorative material by using a substrate to which another pattern layer has been laminated. In addition, according to the present invention, it is possible to provide a still more decorative decorative material by using a substrate to which an even and uniform coloring layer and another pattern layer have been laminated in the order mentioned; such a decorative material is free from color shading even if the substrate itself has color shading.

BRIEF DESCRIPTION OF THE DRAWINGS

By referring now to the accompanying drawings and the following embodiment, the present invention will be explained more specifically.

In the drawings.

DETAILED DESCRIPTION OF PREFERRED EMBODIMENTS

Figure 1:
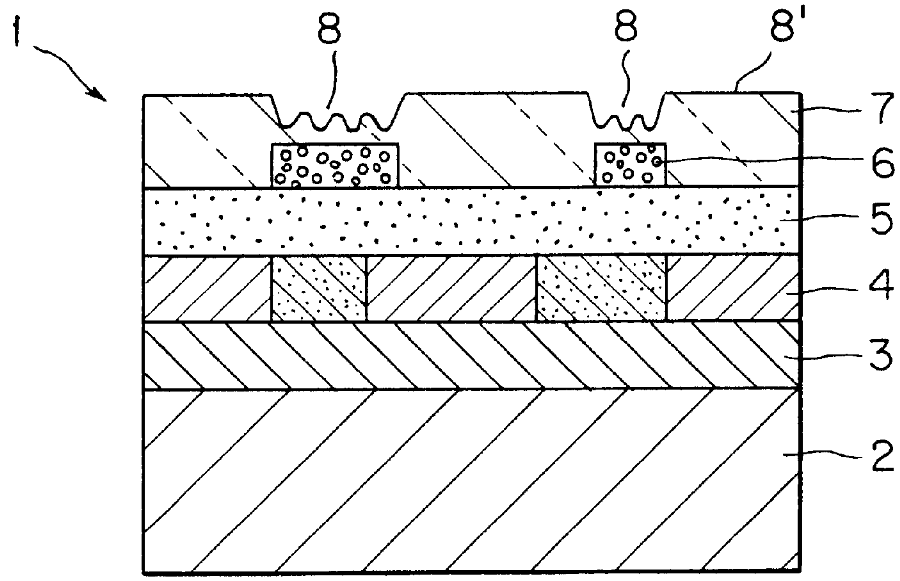
FIG. 1 is a cross-sectional view showing one embodiment of the decorative material according to the present invention.
Figure 2:
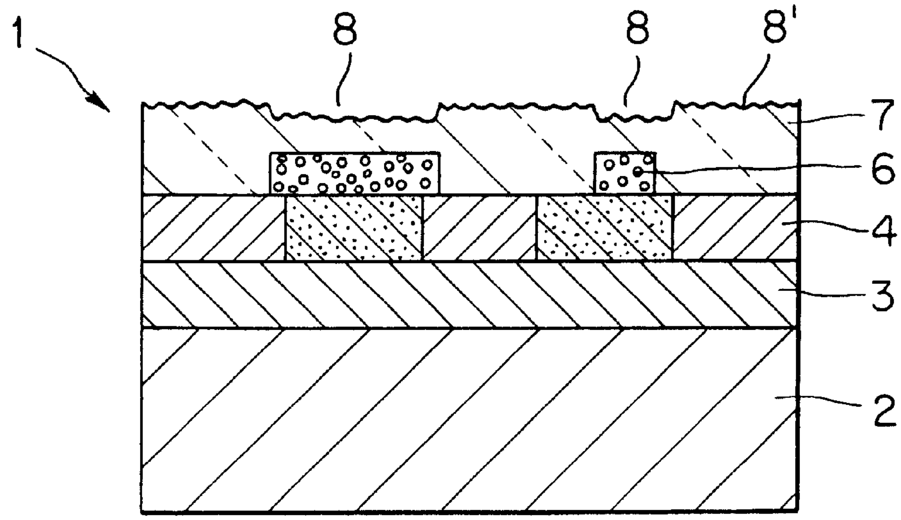
FIG. 2 is a cross-sectional view showing a conventional decorative material.

By referring to FIG. 1, a typical constitution of the decorative material of the present invention will be described hereinafter. In a decorative material 1, an even and uniform coloring layer 3 is laminated to a substrate 2, and a pattern layer 4 is laminated to the coloring layer 3; to the pattern layer 4, an even and uniform penetration-preventing coating layer 5 having low permeability for an ionizing radiation hardening resin composition that will be used for forming the topmost layer of the decorative material is laminated; to this coating layer 5, a highly permeable pattern layer 6 having permeability for the ionizing radiation hardening resin composition higher than that of the underlying coating layer 5 is further laminated; and a surface-protective layer 7 is formed, as the topmost layer, on the highly permeable pattern layer 6 by applying the ionizing radiation hardening resin composition to form a film and hardening the film by crosslinking. Since the ionizing radiation hardening resin composition penetrates into the highly permeable pattern layer 6, those parts of the surface-protective layer 7 that are right above the highly permeable pattern layer 6 are recessed below the surface, and, at the same time, have decreased gloss to form mat (delustered or recessed) parts 8 (having low gloss).

Those parts other than the mat parts 8 form glossy (protruded) parts 8' (having high gloss) that are protruded and glossy as compared with the surrounding parts.

Any absorbtive and/or permeable material can be used as the substrate 2 as long as it is usually used for producing decorative materials. Examples of such materials include paper of various types, plastic films or sheets, metallic foils, sheets or plates, wooden boards such as timber, and various ceramic materials. When absorptive/permeable materials are used for the substrate, the actions or effects of the present invention become most remarkable. Of the above-described materials, paper of various types, wooden boards, ceramic materials, porous plastic sheets, and porous metallic foils, sheets or plates come under the classification of absorptive/permeable materials.

These materials may be used singly. However, it is also possible to use as the substrate a composite of any of these materials, such as a paper/paper laminated composite or a paper/plastic film laminated composite. These substrate materials may be coated with coating materials for the purpose of color conditioning, or provided with conventional patterns that are effective for the total design. Before this step, the surfaces of the substrate materials may be smoothened; or, in order to obtain improved adhesion between the patterns and the substrate materials, the substrate materials may be subjected to physical treatment such as corona discharge treatment, or provided with primer layers, as needed. Also after the step of coating or forming conventional patterns, the substrate materials may be subjected to adhesion-improving treatment so that they can be processed easily in the steps that follow.

Typical examples of paper of various types include tissue paper, kraft paper, titanium paper, resin-impregnated paper having increased strength, linter pulp paper, paperboard, base paper for plasterboard, and a series of raw fabrics that are often used in the field of construction materials. Moreover, the following paper that is used for office work, or for ordinary printing, packaging, or the like can also be used: wood-free paper, coated paper, art paper, parchment paper, glassine paper, paraffin paper, and Japanese paper. The following woven or non-woven fabrics of various fibers, having appearances and properties similar to those of paper can also be used for the substrate 2. Examples of fibers useful for producing such woven or non-woven fabrics include glass fiber, asbestos fiber, potassium titanate fiber, alumina fiber, silica fiber, inorganic fibers such as carbon fiber, and synthetic resin fibers such as polyester fiber and Vinylon fiber.

Examples of plastic films or sheets that can be used for the substrate 2 include those ones made from various synthetic resins such as olefin resins, for example, polyethylene resin, polypropylene resin, polymethylpentene resin, polybutene resin, ethylene—propylene copolymer resin and thermoplastic olefin elastomers, polyvinyl chloride resin, polyvinylidene chloride resin, polyvinyl alcohol resin, vinyl chloride—vinyl acetate copolymer resin, ethylene—vinyl acetate copolymer resin, polyester resins, for example, polybutylene terephthalate resin, polyethylene naphthalate, ethylene—terephthalate—isophthalate copolymer resin, thermoplastic polyester elastomers, acrylic resins, for example, polymethyl (meth)acrylate resin, polyethyl (meth) acrylate resin, polybutyl (meth)acrylate resin and methyl (meth)acrylate—butyl (meth)acrylate copolymer resin, polyamide resins represented by nylon 6 and nylon 66, cellulose triacetate resin, cellophane, polystyrene resin, polycarbonate resins, polyarylate resins, and polyimide resins.

There may also be used porous resins that can be obtained by adding extender pigments to these resins and extending the mixtures, or by adding expanding agents to the resins and expanding the mixtures.

Metallic foils, sheets, or plates made from the following metals can also be used for the substrate 2: aluminum, duralumin, iron, carbon steel, stainless steel and copper. Metallic foils, sheets, or plates are often plated before use. Metallic foils, sheets, or plates whose surfaces have been coated with porous oxide layers may also be used.

Examples of useful wooden boards include veneer, plywood, particle board, and medium-density fiber board called MDF.

Examples of useful ceramic materials include ceramic construction materials such as plasterboards, calcium silicate boards and wood chip cement boards, pottery, earthenware, glass, enameled ware and calcined tiles. Besides there materials, a composite of various materials, such as a fiber-reinforced plastic board, a paper honeycomb whose both surfaces are covered with iron plates, or a polyethylene resin sheet sandwiched between two aluminum plates, can also be used in the present invention as the substrate 2.

Both the coloring layer 3 and the pattern layer 4 are means for imparting decorative properties to the substrate 2.

The coloring layer 3 serves to control the color of the surface of the substrate 2, and is formed, when the substrate 2 itself is colored or has color shading, to give a desired color to the surface of the substrate 2. Although the coloring layer 3 is usually a non-transparent colored layer, it may be formed as a transparent colored layer if it is desired to make use of an inherent pattern of the substrate.

When Printing is conducted on paper to make books, posters, or the like. This paper is usually white in color, and a low-printing-density part on the paper forms a highlighted part because the underlying white color can be seen. If such an effect is desired, the coloring layer 3 is not formed. The formation of the coloring layer 3 can be omitted when it is desired to make use of the color of the substrate 2, which is generally white, or when the substrate 2 itself has been colored properly.

The pattern layer 4 is a primary means to impart decorative properties to the substrate 2. This layer is obtained by printing various patterns using ink and a printing machine.

Examples of patterns that can be printed to form the pattern layer 4 include patterns of veins, grains, rock surfaces such as marble, sand stone texture of cloth, tiles, polka dots, stripes, and flowers. Mosaic patterns, patchworks, etc. that are combinations of any of the above patterns may also be acceptable. These patterns are based on conventionally existing patterns. Alternatively, artificially designed patterns can also be used. Further, starting from the above-described patterns, new patterns may be created through the application of one of or two or more of such techniques as enlargement, reduction, rotation, cutting, repetition, composition, extraction or thinning of characteristic parts, and deformation.

These patterns are generally formed by means of multi-color printing using ordinary process colors. They can also be formed, for example, by means of multi-color printing using special colors, that is, using plates for individual colors that constitute the pattern to be printed.

The coloring layer 3 and the pattern layer 4 can be formed by the use of coating or ink compositions that are similar to each other.

For the resin component of the coating or ink composition, it is proper to use one of thermosetting resins (including resins of two-part reaction hardening type) and ionizing radiation hardening resins.

There are many thermosetting resins, and, in principle, any one of them can be used in the present invention.

However, for the production of sheet-type decorative materials that are predominant in the present invention, it is desirable to use thermosetting resins having flexibility in order to keep the decorative materials flexible. Preferred examples of such thermosetting resins include unsaturated polyester resins, and polyurethane resins. Of these, polyurethane resins are particularly preferred.

A proper mixture of prepolymers, oligomers and/or monomers having in their molecules a polymerizable unsaturated group such as (meth)acryloyl or (meth)acryloyloxy group, or epoxy group is used for the ionizing radiation hardening resin composition. It is noted that (meth)acryloyl group means acryloyl group or methacryloyl group.

Examples of prepolymers or oligomers for use in the ionizing radiation hardening resin composition include unsaturated polyesters such as condensation products between unsaturated dicarboxylic acids and polyhydric alcohols, (meth)acrylates such as polyester (meth)acrylate, urethane (meth)acrylate, epoxy (meth)acrylate, polyether (meth)acrylate, polyol (meth)acrylate and melamine (meth) acrylate, and cation-polymerizable epoxy compounds. The term (meth)acrylate herein means acrylate or methacrylate.

Examples of monomers for use in the ionizing radiation hardening resin composition include styrene monomers such as styrene and a-methylstyrene, (meth)acrylic esters such as methyl (meth)acrylate, 2-ethylhexyl (meth)acrylate, methoxyethyl (meth)acrylate, butoxyethyl (meth)acrylate, butyl (meth)acrylate, methoxybutyl (meth)acrylate, phenyl (meth) acrylate, ethyl (meth)acrylate, propyl (meth)acrylate, ethoxymethyl (meth)acrylate and lauryl (meth)acrylate, aminoalcohol esters substituted with unsaturated groups such as 2-(N,N-diethylamino)ethyl (meth)acrylate, 2-(N,N-dimethylamino)ethyl (meth)acrylate, 2-(N,N-dibenzylamino)methyl (meth)acrylate and 2-(N,N-diethylamino)propyl (meth)acrylate, unsaturated carboxylic amides such as (meth)acrylamide, polyfunctional (meth) acrylate compounds such as ethylene glycol di(meth) acrylate, propylene glycol di(meth)acrylate, neopentylglycol di(meth)acrylate, 1,6-hexanediol di(meth)acrylate, triethylene glycol di(meth)acrylate, dipropylene glycol di(meth)acrylate, diethylene glycol di(meth)acrylate, trimethylolpropane tri(meth)acrylate, pentaerythritol tri(meth) acrylate, pentaerythritol tetra(meth)acrylate, dipentaerythritol penta (meth) acrylate, and dipentaerythritol hexa(meth) acrylate, and/or polythiol compounds having two or more thiol groups in their molecules, for example, polyfunctional compounds such as trimethylolpropane trithioglycolate, trimethylolpropane trithiopropylate and pentaerythritol tetrathioglycolate. The term (meth)acrylic esters herein means acrylic or methacrylic esters.

In general, the above-enumerated compounds are used either singly or as a mixture of two or more members as the monomer for use in the ionizing radiation hardening resin composition. To impart ordinary coating properties to the ionizing radiation hardening resin composition, it is preferable to use the above-described prepolymer or oligomer in an amount of 5% by weight or more, and the above-described monomer and/or polythiol compound in an amount of 95% by weight or less.

If a hardened film of the ionizing radiation hardening resin composition is required to have flexibility, the monomer is used in a decreased amount, or an acrylate monomer having one or two functional groups is used. When a hardened film of the ionizing radiation hardening resin composition is required to have resistance to abrasion, heat and solvents, an acrylate monomer having three or more functional groups is used. Thus, it is possible to properly design the ionizing radiation hardening resin composition. Examples of acrylate monomers having one functional group include 2-hydroxy(meth)acrylate, 2-hexyl (meth) acrylate and phenoxyethyl (meth)acrylate. Examples of acrylate monomers having two functional groups include ethylene glycol di(meth)acrylate and 1,6-hexanediol di(meth)acrylate. Examples of acrylate monomers having three or more functional groups include trimethylolpropane tri(meth)acrylate, pentaerythritol tri(meth)acrylate, pentaerythritol tetra(meth)acrylate, and dipentaerythritol hexa (meth)acrylate.

To control the physical properties such as flexibility and surface hardness of the hardened film of the ionizing radiation hardening resin composition, it is also possible to add, to the ionizing radiation hardening resin composition, a resin that is not hardened even when irradiated with ionizing radiation. Specific examples of such resins include thermoplastic resins such as polyurethane resins, cellulose resins, polyvinyl butyral resins, polyester resins, acrylic resins, polyvinyl chloride resins and polyvinyl acetate. Of these, polyurethane resins, cellulose resins and polyvinyl butyral resins are preferred from the viewpoint of improvement in flexibility.

In the case where the film of the ionizing radiation hardening resin composition formed is hardened by ultraviolet irradiation, a photopolymerization initiator or a photopolymerization promoter is added to the composition. When a resin having a radically polymerizable unsaturated group is used for the ionizing radiation hardening resin composition, acetophenones, benzophenones, thioxanthones, benzoin, benzoin methyl ether, and the like are used either singly or as a mixture of two or more members as the photopolymerization initiator. When a resin having a cation-polymerizable functional group is used for the ionizing radiation hardening resin composition, aromatic diazonium salts, aromatic sulfonium salts, aromatic iodonium salts, metallocene compounds, benzoin sulfonic esters, and the like are used either singly or as a mixture of two or more members as the photopolymerization initiator. The photopolymerization initiator is added in an amount of 0.1 to 10 parts by weight for 100 parts by weight of the ionizing radiation hardening resin composition.

To the above-described resin component, coloring agents such as pigments or dyes, other additives, solvents, diluents, etc. are added, and the mixture is kneaded to obtain a coating or ink composition. Examples of useful pigments include inorganic pigments such as titanium white, carbon black, red iron oxide, chrome yellow and ultramarine, organic pigments such as quinacridone red, isoindolinone yellow and phthalocyanine blue, and glitters such as scaly foils of aluminum, brass, and mica coated with titanium dioxide.

The coloring layer 3 or the pattern layer 4 is formed by a conventional coating or printing method using the above-described coating or ink composition. Examples of coating or printing methods that can be used herein include roll coating, gravure coating, spray coating, gravure printing, offset printing, letterpress printing, ink-jet printing, and screen process printing.

The film formed may be dried with a device attached to a machine that is used when one of the above methods is effected. In the case where a thermosetting resin component is used, hardening of the film formed is conducted by heating, or by warming it at a relatively low temperature for a long time, or by allowing it to stand at normal temperatures. When an ionizing radiation hardening resin component is used, the film formed is hardened by ultraviolet or electron irradiation. For this ultraviolet irradiation, ultraviolet rays emitted from such a light source as a high- or low-pressure mercury vapor lamp or a black light lamp, having wavelengths chiefly in the range of approximately 1900 to 3800 angstroms are used in an irradiation dose of about 50 to 1000 mJ/cm$^2$. For the electron irradiation, electron beams emitted from such an electron beam accelerator as a Cockcroft-Walton accelerator, a van de Graaff accelerator or a resonance-transformer-type accelerator at an accelerating voltage of about 100 to 1000 KeV are used in an irradiation dose of about 1 to 30 Mrad.

In the decorative material of the present invention, the even and uniform penetration-preventing coating layer 5 having low permeability for the ionizing radiation hardening resin composition that will be used for forming the surface-protective layer is formed on the substrate 2 on which the coloring layer 3 and/or the pattern layer 4 has been provided or not provided, The penetration-preventing coating layer 5 has the function of preventing the ionizing radiation hardening resin composition for forming the surface-protective layer, which will be described later in detail, from penetrating into the substrate 2. If this coating layer 5 is not present, a large part of the ionizing radiation hardening resin composition applied to form the surface-protective layer 7 penetrates into the underlying pattern layer 4, or into the coloring layer 3 if exists, or into the substrate 2 if the substrate has absorptivity or permeability. As a result, the surface-protective layer 7 has a decreased thickness, and, at the same time, its surface has decreased smoothness. Therefore, the differences in level of the surface and in surface gloss between those parts of the surface-protective layer 7 that are right above the highly permeable layer 6 and the other area become small and obscure. In addition, the surface properties required, such as solvent resistance, cannot be obtained.

To form the penetration-preventing coating layer 5, it is preferable to use a thermosetting coating or ink composition (including a composition of two-part reaction hardening type) or an ionizing radiation hardening coating or ink composition. The resin component of such a composition is basically the same as that of the aforementioned coating or ink composition used for forming the coloring layer 3 or the pattern layer 4. It is preferable to use a polyurethane resin as the resin component from the viewpoints of penetration-preventing effect, flexibility and adhesiveness. A polyurethane resin is polyurethane obtainable by using a polyol (polyhydric alcohol) as a main agent, and an isocyanate as a crosslinking agent (hardening agent).

Examples of useful polyols include those ones having in their molecules two or more hydroxyl groups, such as polyurethane polyols, polyethylene glycol, polypropylene glycol, acrylic polyols, polyester polyols, polyether polyols and polycarbonate polyols. In the case where the surface-protective layer will be made from a (meth)acrylate prepolymer, oligomer or monomer, it is particularly preferable to use an unsaturated polyester urethane polyol. When a polyol of this type is used, the unsaturated polyester moiety contained in the coating layer chemically combines with the (meth)acryloyl group contained in the surface-protective layer, so that increased adhesion is obtained between the coating layer and the surface-protective layer. Such an unsaturated polyester urethane polyol can be obtained by reacting a polyester polyol having unsaturated bond with an isocyanate to give a polyurethane while allowing excess hydroxyl groups to remain in its molecule.

A polyvalent isocyanate having two or more isocyanate groups in its molecule is used as the isocyanate. Examples of such polyvalent isocyanates include aromatic isocyanates such as 2,4-tolylene diisocyanate, xylene diisocyanate and 4,4-diphenylmethane diisocyanate, and aliphatic or alicyclic isocyanates such as 1,6-hexamethylene diisocyanate, isophorone diisocyanate, hydrogenated tolylene diisocyanate and hydrogenated diphenylmethane diisocyanate. Addition products or multimers of these isocyanates, for instance, an addition product or trimer of tolylene diisocyanate can also be used.

When this penetration-preventing coating layer 5 is formed, it is substantially unnecessary to add a pigment or dye to the coating or ink composition for forming the coating layer 5 because the underlying pattern layer 4 (and also the coloring layer 3 if exists) imparts a color and a pattern to the substrate 2.

The gloss of the decorative material may be adjusted by incorporating a matting agent into this coating layer 5. If a matting agent is added to a conventional coating material, the resultant penetration-preventing coating layer 5 tends to have increased permeability for the ionizing radiation hardening resin composition, so that the addition of a matting agent is not always favorable. However, if a matting agent is added to the thermosetting or ionizing radiation hardening coating or ink composition, the resultant coating layer 5 does not show increased permeability for the ionizing radiation hardening resin composition. When a matting agent is used in an excessive amount, the decorative material appears cloudy, so that it is better to avoid excessive use of a matting agent.

It is more preferable to incorporate, into a polyester polyol, a polyfunctional monomer such as trimethylolpropane tri(meth)acrylate in addition to an isocyanate, and to harden a film of this mixture by crosslinking simultaneously with the hardening of the surface-protective layer that is conducted by ultraviolet or electron irradiation. By doing so, a decorative material more excellent in durability, especially in solvent resistant can be obtained.

The thickness of the penetration-preventing coating layer 5 varies depending upon the amount of the filler added, and is generally about 1 to 5 μm. Since evenness is required for the coating layer 5, it is better to apply the coating or ink composition consecutively two times through the application of a coating or printing means.

In the formation of the penetration-preventing coating layer 5, drying and hardening are conducted in the same manner as in the formation of the aforementioned coloring layer 3 or pattern layer 4.

On top of the penetration-preventing coating layer 5, the highly permeable pattern layer 6 is formed by the use of a resin comprising a filler. This pattern layer 6 has permeability for the ionizing radiation hardening resin composition higher than that of the penetration-preventing coating layer 5.

In order to impart improved solvent resistance to the resulting decorative material, it is preferable to use, for forming the highly permeable pattern layer 6, a coating or ink composition containing a crosslinkable hardening resin. Such a composition is the same as the one used for forming the above-described coloring layer 3 or pattern layer 4. Moreover, the technique used for forming the coloring layer 3 or the pattern layer 4 can be applied to the formation of the highly permeable pattern layer 6.

Examples of useful fillers include inorganic particles such as silica, alumina, calcium carbonate, barium sulfate, zeolite, diatomaceous earth, activated montmorillonite clay and kaolinite, and fine plastic beads. The amount of the filler to be added varies depending upon the desired thickness of the pattern layer 6. In general, however, the filler is used in an amount of 1 to 100 parts by weight for 100 parts by weight of the resin component (including those substances that become resinous solids when the film of the coating or ink composition is hardened by crosslinking) of the coating or ink composition that is used for forming the pattern layer 6.

Some fillers tend to whiten the highly permeable pattern layer 6. It is therefore more preferable to use finely divided silica as the filler.

There is a case where a filler is incorporated also into the aforementioned penetration-preventing coating layer 5. In this case, the permeability for the ionizing radiation hardening resin composition of the highly permeable pattern layer 6 formed on the coating layer 5 is made higher than that of the coating layer 5 by adjusting the amounts of the fillers to be added to these two layers. For example, the proportion of the filler to 100 parts by weight of the resin component in the coating or ink composition for forming the highly permeable pattern layer 6 is made two times, or more than two times the proportion of the filler to the same in the coating or ink composition for forming the coating layer 5. Alternatively, while the above two proportions are made equal, a filler whose particle diameter is two times, or more than two times the particle diameter of the filler used in the coating or ink composition for forming the coating layer 5 is used in the coating or ink composition for forming the pattern layer 6. In the case of a filler having a particle diameter of 10 μm or more, it is preferable that the filler be used in an amount of not more than 200 parts by weight for 100 parts by weight of the resin component of the coating or ink composition for forming the highly permeable pattern layer 6. As long as such a filler is used in an amount in this range, the highly permeable pattern layer 6 does not undergo excessive whitening.

It is also preferable to use, as the filler, porous particles selected from zeolite, diatomaceous earth, activated montmorillonite clay, and the like.

It is preferable to form the highly permeable pattern layer 6 so that it will coincide with those parts of the pattern expressed by the above-described decorative pattern layer 4 that should be emphasized by recessed or matted parts of the surface-protective layer. However, this is not always needed. It is better to form the highly permeable pattern layer 6 so that it will coincide at least with the pattern of vessels. The same is applied to a pattern of joints of tiles. When the pattern shows the grain of leather, the straight grain of wood, or the texture of cloth, it is not necessary to make the highly permeable pattern layer 6 coincide with the pattern.

In general, when the pattern expressed by the pattern layer 4 is fine and repetitive, it is not always necessary to make the highly permeable pattern layer 6 coincide with the pattern. However, when the pattern is large and non-repetitive, it is better to make the pattern layer 6 coincide with the pattern.

The technique for forming the coating layer 5, including drying and hardening is the same as the previously mentioned technique used for forming the coloring layer 3 or the pattern layer 4.

The surface-protective layer 7 is provided as the topmost surface of the decorative material of the present invention. This layer is a film of the ionizing radiation hardening resin composition, hardened by crosslinking. Components that are used for forming the surface-protective layer 7 are the same as those described hereinbefore. To adjust the surface gloss of the decorative material, a matting agent may be incorporated into the surface-protective layer 7. The ionizing radiation hardening resin composition that forms the surface-protective layer 7 is prepared by using materials properly selected from the above-exemplified materials for use in the coating or ink composition for forming the coloring layer 3 or the pattern layer 4.

From the viewpoint of surface protection, it is better to make the thickness of the surface-protective layer 7 greater. However, when the substrate is in sheet form, it is preferable that the thickness of the surface-protective layer 7 be in the range of 2 to 10 μm from the viewpoints of properties required, economical efficiency, and flexibility required. In the case where the substrate is of board type, the thickness of the surface-protective layer 7 is preferably from 5 to 100 μm.

The technique for forming the surface-protective layer 7 including drying and hardening is the same as the previously mentioned technique used for forming the coloring layer 3 or the pattern layer 4. Since the surface-protective layer 7 is absorbed by the highly permeable pattern layer 6 or penetrates into the same, recessed or mat (delustered) parts 8 are produced in this layer. Owing to this absorption/penetration that occurs unevenly, or to the filler particles contained in the highly permeable pattern layer 6, the recessed parts have roughened surfaces. Light is scattered at these roughened surfaces, so that these parts become mat (low gloss).

EXAMPLES

Example 1

A coloring layer, and a pattern layer having a pattern of the grain in wood were successively formed on tissue paper ("FLEX30" manufactured by Sanko Seishi Kabushiki Kaisha, Japan, thickness: 30 μm) by means of gravure printing using a two-part hardening polyurethane resin ink composition ("UE" (two liquids) manufactured by Showa Ink Kogyo-sho Kabushiki Kaisha, Japan).

Subsequently, solid printing was conducted twice on the pattern layer by the use of a nearly transparent ink composition and a solid gravure plate with a cell depth of 54 μm to form a penetration-preventing coating layer having a thickness of 3 μm (when dried), capable of preventing the penetration of a coating material that would be used for forming a surface-protective layer. The ink composition used was a two-part hardening polyester polyurethane resin ink composition (manufactured by Inctec, Co., Ltd., Japan, 2% by weight of silica particles having an average particle diameter of 5 μm being added to 100 parts by weight of the ink composition) that was a 100:8 (weight basis) mixture of an unsaturated polyester polyurethane polyol and 1,6-hexamethylene diisocyanate.

Immediately after the formation of the coating film, a highly permeable pattern layer expressing a pattern of vessels was printed by the use of a permeable-film-forming ink composition and a gravure plate so that the pattern of vessels would be fitted to the previously-formed pattern of the grain in wood. The resultant was heated in a hot air dryer set at 160° C. for 30 seconds to obtain veined paper.

For the formation of the pattern of vessels, a one-part hardening polyurethane resin ink composition (manufactured by Inctec, Co., Ltd., Japan, 10% by weight of silica particles having a mean particle diameter of 10 μm being added to 100 parts by weight of the transparent ink composition) was used.

To the surface of the above veined paper, an electron beam hardening coating material consisting of 60 parts by weight of tri-functional polyester acrylate prepolymer, 10 parts by weight of trimethylolpropane triacrylate, 29 parts by weight of 1,6-hexanediol diacrylate and 1 part by weight of silicon acrylate was applied in an amount of 5 $g/m^2$ (as calculated in terms of the solid components after hardening) by means of gravure roll coating to form a film. This film was hardened by irradiating it with 3 Mrad of electron beams at an acceleration voltage of 175 kV. By this electron irradiation, the film present on top of the highly permeable pattern layer showing the pattern of vessels penetrated into the highly permeable pattern layer, so that this part of the film recessed below the surface, and also became mat. Thus, a veined decorative sheet having a sectional structure as shown in FIG. 1 was obtained.

Example 2

The procedure of Example 1 was repeated to obtain a veined decorative sheet, provided that the two-part hardening polyurethane ink composition used in Example 1 for forming the coloring layer and the pattern layer was changed to an ink composition containing as its binder a mixture of an acrylic resin and nitrocellulose, thermoplastic resins.

Example 3

The procedure of Example 1 was repeated to obtain a veined decorative sheet, provided that the two-part hardening polyester polyurethane resin ink composition used in Example 1 for forming the penetration-preventing coating layer was changed to an ink composition containing as its binder a 100:8:1 (weight basis) mixture of an unsaturated polyester urethane polyol, 1,6-hexamethylene diisocyanate and trimethylolpropane triacrylate.

Comparative Example 1

The procedure of Example 1 was repeated to obtain a comparative veined decorative sheet, provided that the silica added to the one-part hardening polyurethane resin ink composition used in Example 1 for forming the highly permeable pattern layer expressing the pattern of vessels was changed to silica having a smaller mean particle diameter of 5 $\mu$m.

Comparative Example 2

The procedure of Example 1 was repeated to obtain a comparative veined decorative sheet, provided that the silica added to the two-pack hardening polyester polyurethane resin ink composition used in Example 1 for forming the penetration-preventing coating layer was changed to silica having a greater mean particle diameter of 10 $\mu$m.

Comparative Example 3

The procedure of Example 1 was repeated to obtain a comparative veined decorative sheet, provided that the amount of the silica added to the one-part hardening polyurethane resin ink composition used in Example 1 for forming the pattern of vessels was increased to 30 parts by weight.

Comparative Example 4

The procedure of Example 2 was repeated to obtain a comparative veined decorative sheet, provided that the penetration-preventing coating layer formed in Example 1 was not formed.

The veined decorative sheets obtained in the above Examples 1 to 3 and Comparative Examples 1 to 4 were evaluated. Items and methods for evaluation are as follows. The results are shown in Table 1.

(1) Adhesion: Square notches of 2 mm×2 mm were provided on the surface of each one of the decorative sheets. Peeling test was conducted three times by the use of an adhesive cellophane tape (Manufactured by Nichiban Co., Ltd. Japan) having a width of 1 inch. In the table, "○" means that no separation was observed at the surface of the decorative sheet; and "×" means that separation was observed at the surface of the decorative sheet.

(2) Resistance to abrasion with steel wool: The surface of each one of the decorative sheets was rubbed with steel wool. In the table, "○" means that the decorative sheet was not abraded; and "×" means that the decorative sheet was abraded.

(3) Solvent resistance: A weight of 1 kg was wrapped with a cotton cloth, and this cotton cloth was then impregnated with methyl ethyl ketone. The surface of each one of the decorative sheets was wiped with this weight by moving it back and forth. The number of back-and-forth movements required to erase the pattern on the decorative sheet is shown in the table.

(4) Impression of unevenness: The pattern of vessels that was emphasized by the mat parts of the surface-protective layer was visually observed, and evaluated in terms of the impression of unevenness given by the mat parts and the glossy parts. In the table, "○" means that the impression of unevenness is excellent; "Δ" means that the impression of unevenness is poor; and "×" means that the unevenness is obscure.

TABLE 1

| | Adhesion | Resistance to abrasion with steel wool | Solvent resistance (times) | Impression of unevenness |
|---|---|---|---|---|
| Example 1 | ○ | ○ | 300 | ○ |
| Example 2 | ○ | ○ | 250 | ○ |
| Example 3 | ○ | ○ | 400 | ○ |
| Comparative Example 1 | ○ | ○ | 300 | Δ The differences in gloss are small, so that the impression of unevenness is poor. |
| Comparative Example 2 | ○ | ○ | 300 | Δ The entire surface of the facing sheet is whitish, so that the impression of unevenness is poor. |
| Comparative Example 3 | ○ | ○ | 300 | Δ The pattern of vessels is opaque; the unevenness does not impart reality to the pattern. |

TABLE 1-continued

| | Adhesion | Resistance to abrasion with steel wool | Solvent resistance (times) | Impression of unevenness |
|---|---|---|---|---|
| Comparative Example 4 | x | ○ | 220 | x The entire surface of the facing sheet is mat and has low gloss, so that the unevenness is obscure. |

What is claimed is:

1. A decorative material comprising:

an absorptive or permeable substrate;

a surface-protective layer provided so as to cover a surface of said substrate, said surface-protective layer being made from an ionizing radiation hardening resin composition that is hardened by crosslinking;

an even and uniform penetration-preventing coating layer provided between said substrate and said surface-protective layer and entirely covering a surface of said substrate, said penetration-preventing coating layer having a low permeability for said ionizing radiation hardening resin composition; and a highly permeable pattern layer provided on said penetration-preventing coating layer and partly and uncontinuously covering a surface of said penetration-preventing coating layer, said highly permeable pattern layer being made from a resin including a filler, and having a permeability for said ionizing radiation hardening resin composition higher than that of said penetration-preventing coating layer, wherein said surface-protective layer has a recess or dulustering at right above said highly permeable pattern layer.

2. The decorative material according to claim 1, wherein said penetration-preventing coating layer and said highly permeable pattern layer are made from a hardening resin that is hardened by crosslinking.

3. The decorative material according to claim 1, wherein said penetration-preventing coating layer is made from a polyurethane resin produced by crosslinking an unsaturated polyester urethane polyol with an isocyanate for hardening, and said surface-protective layer is made from a material selected from the group consisting of a prepolymer, an oligomer and a monomer of (meth)acrylate that is hardened by crosslinking.

4. The decorative material according to any of claim 1, wherein said penetration-preventing coating layer is mat.

5. The decorative material according to any of claim 1, wherein said substrate has another pattern layer laminated to its surface.

6. The decorative material according to any of claim 1, wherein said substrate has an even and uniform coloring layer and another pattern layer that are laminated to the surface of said substrate in the order mentioned.

* * * * *